United States Patent
Kribbe, deceased

[15] 3,655,334
[45] Apr. 11, 1972

[54] METHOD FOR PRODUCING ALKALI METAL AND/OR ALKALI EARTH-METAL PHOSPHATES

[72] Inventor: Kurt Willi Harri Kribbe, deceased, late of Knapsack near Cologne, Germany by Gertrud Katharina Kribbe nee Hanhardt, Heinrich Kribbe, Edith Kribbe nee Kuhrt, Heinz Harnisch, Joseph Crener, heirs

[73] Assignee: Knapsack-Griesheim Aktiengesellschaft, Knapsack near Cologne, Germany

[22] Filed: Nov. 17, 1969

[21] Appl. No.: 871,521

Related U.S. Application Data

[63] Continuation of Ser. No. 375,388, June 15, 1964, abandoned.

[30] Foreign Application Priority Data

July 8, 1963 Germany..............................K 50156

[52] U.S. Cl................................................23/106, 23/108
[51] Int. Cl. .....................................................C01b 25/30
[58] Field of Search...............................23/106, 106 A, 108

[56] References Cited

UNITED STATES PATENTS

| | | | |
|---|---|---|---|
| 1,925,644 | 9/1933 | Pristoupil................................23/106 |
| 2,142,943 | 1/1939 | Kerschbaum............................23/106 |
| 2,142,944 | 1/1939 | Kerschbaum............................23/106 |
| 3,081,150 | 3/1963 | Beltz et al...............................23/106 |
| 3,087,783 | 4/1963 | Hartlapp et al.........................23/106 |
| 3,168,373 | 2/1965 | Hartlapp et al.........................23/106 |

Primary Examiner—Herbert T. Carter
Attorney—Connolly & Hutz

[57] ABSTRACT

A process for obtaining alkali metal phosphates by introducing an alkali metal compound into a phosphorus-oxygen flame, the amount of alkali metal compound fed into the reactor being such that an excess of 1–50 mol percent of $P_2O_5$ is maintained with respect to the ratio of metal oxide to $P_2O_5$ in the final product.

1 Claim, No Drawings

METHOD FOR PRODUCING ALKALI METAL AND/OR ALKALI EARTH-METAL PHOSPHATES

This application is a continuation of Ser. No. 375,388, filed June 15, 1964, and now abandoned.

The present invention relates to a method for producing alkali metal and/or alkaline earth metal phosphates.

It has already been proposed to prepare alkali metal and/or alkaline earth metal phosphates by introducing alkali metal and/or alkaline earth metal compounds into $P_2O_5$-containing hot gases obtained by burning phosphorus. This is a process of the type wherein phosphorus, which is preferably molten, is reacted with a gas containing free oxygen and with an alkali metal and/or alkaline earth metal compound by means of a multi-material nozzle, the reaction being carried out in a stationary reaction chamber in upright position, whose graphite walls are gas-cooled, e.g. with air; the graphite walls of the reaction chamber are impregnated at the start of the reaction with a phosphate melt and cooled so as to maintain their inside surface areas at temperatures above the melting points of the phosphates to be produced, preferably 20 to 50 centigrade degrees above the temperature at which the phosphates start flowing; and wherein, after the reaction, the phosphates are removed from the reaction chamber in the form of a melt.

In this process the resulting phosphate melt, before it is withdrawn from the reaction chamber, is allowed to accumulate as a sump phase in the bottom portion of said reaction chamber and then removed in quantities so as to leave a sump phase containing the quantity of phosphate produced within a period of at least about 10 minutes, preferably at least about 30 minutes. The off-gas is removed from the reaction chamber in the vicinity of said sump phase, preferably directly above its surface.

The melt phase in the reaction chamber is maintained molten by means of an additional heating means. Cooling gas is distributed over the cooling system of the graphite wall in a manner corresponding to the temperature gradient in the reaction chamber so that the inside surface area of the wall can be maintained uniformly at the desired temperature. The molten phosphorus obtained can be atomized by means of compressed air or some other compressed gas containing free oxygen through the multi-material nozzle so that a twist effect is conferred upon the resulting reaction products leaving the nozzle. Still further, the alkali metal and/or alkaline earth metal compound, which may be suspended in a stream of carrier gas, e.g. air, may be blown into the multi-material nozzle, preferably tangentially thereto, so as to confer a twist effect upon the resulting salt-gas mixture leaving the nozzle.

At the start of the above process, the graphite wall of the reaction chamber is impregnated with a thinly liquid phosphate melt produced inside the reaction chamber and having an alkali metal oxide to $P_2O_5$—molar ratio of less than about 1.3, preferably less than 1.1, by allowing the said phosphate melt to flow over the inside surface area of the graphite wall. During the impregnation of the graphite wall, the pressure in the cooling system thereof is maintained at a level lower than the pressure in the reaction chamber. However, during the main reaction, the cooling system of the graphite wall is preferably maintained at a pressure higher than that prevailing in the reaction chamber.

The apparatus used in carrying out the above process comprises a stationary, preferably cylindrically shaped reaction tower having a phosphorus combustion nozzle disposed at its top portion. The walls of the reaction tower are vertical or only slightly deviate from the vertical and consist of seamless-jointed graphite provided with bores or passageways to guide cooling gases. The reaction tower is optionally surrounded by a jacket which substantially does not contact the outside surface area of the graphite wall so as to leave an intermediate space improving the guidance of the cooling gases between the graphite and the jacket. The ratio of height to diameter of the reaction chamber is situated between about 2:1 to 5:1, preferably about 3:1. The cooling system is preferably subdivided into a plurality of cooling zones arranged horizontally one above the other and separated from each other. The graphite wall consists of structural elements including blocks, plates or segments which are jointed together in seamless fashion in the absence of any binder or cement. In its lower portion, the reaction tower may preferably be equipped with additional inserts including e.g. phosphate melt-impregnated graphite pipes, bars, plates and blocks. The above structural elements and/or inserts may be made of electrolytic graphite, preferably after-compacted by conventional means. The reaction tower also comprises in its bottom portion an overflow pipe which may be variable in height.

It has also been proposed to prepare alkali metal and/or alkaline earth metal phosphates from phosphorus and alkali metal and/or alkaline earth metal hydroxides or salts having a volatile anion and a gas containing free oxygen. In this process, the above alkali metal and/or alkaline earth metal compounds, which are at least partially in the form of an aqueous solution or suspension, are directly sprayed within a reaction chamber into or in the immediate vicinity of a flame produced by burning phosphorus, which is preferably molten, and the resulting off-gases and the resulting phosphates are removed from the reaction chamber, the latter in the form of a melt. The reaction components are fed equidirectionally to a reaction zone and preferably concentrically to each other. The solution or suspension to be atomized is fed jointly and within the center of the other reactants fed concentrically to each other so as to arrive in the reaction zone. Alternatively, the solution or suspension to be sprayed may be atomized at least partially from the outside in a direction towards the center of the phosphorus flame. In the reaction chamber, the phosphorus should flow at a velocity of about 0.5 to 5 m/second, the solution or suspensions to be sprayed at a velocity of about 1 to 12 m/second, the gas used for the spraying of the solution or suspension at a velocity of about 300 to 1,500 m/second, and the gas required for the atomization and burning of the phosphorus at a velocity of about 50 to 350 m/second.

According to a further feature of this process, the off-gases coming from the reaction chamber are fed to a single or multi-stage wet scrubbing operation and the resulting scrubbing liquid is recycled to the reaction chamber and sprayed into or in the immediate vicinity of the phosphorus flame. The scrubbing liquid includes water and dilute phosphoric acid and is dearsenized in conventional manner before it is recycled to the reaction chamber. The scrubbing liquid coming from the first stage should contain about 10 to 60 percent by weight, preferably about 30 to 50 percent by weight, solid matter. The alkali metal and/or alkaline earth metal solid hydroxide and/or salt with a volatile acid used as the starting material is dissolved or suspended in the scrubbing liquid coming from the wet scrubbing stage before the scrubbing liquid is recycled to and atomized inside the reaction chamber. Solid salt in finely divided form may be suspended in the scrubbing solution and the resulting suspension atomized. Aqueous alkali liquors containing between about 10 to 90 percent by weight, preferably 30 to 70 percent by weight, solid matter may also be used as the starting material.

The alkali metal and/or alkaline earth metal salts having a volatile anion used in this process include the carbonates, nitrates and halides, especially the chlorides, of the aforesaid metals. The alkali metal and/or alkaline earth metal compounds may partially be used in the form of an aqueous solution or suspension and the balance thereof in finely divided solid form, and atomized into or in the immediate vicinity of the phosphorus flame. The solid portion of the alkali metal and/or alkaline earth metal compounds is atomized centrally within the phosphorus flame and the solution or suspension portion thereof is atomized from the outside into said flame. The solid portion of the alkali metal and/or alkaline earth metal compounds suspended in a stream of carrier gas, e.g. air, may be blown into a multi-material nozzle serving to feed the starting components, preferably tangentially thereto, so as to confer a twist effect upon the salt-gas mixture leaving the nozzle.

The reaction is carried out in a reaction chamber in upright position having gas-cooled graphite walls over the inside surface area of which the phosphate melt produced therein is caused to flow. The inside surface areas of the graphite walls are cooled and thereby maintained at temperatures below about 900° C, preferably below 750° C, but not lower than about 100 centigrade degrees below the temperature at which the phosphate to be produced starts flowing as a melt. The graphite walls are more especially cooled so as to obtain a layer of entirely or partially solidified phosphate melt at most about 20 mm, preferably 5 to 10 mm, thick on the inside surface area of the said walls. At the start of the process, the graphite walls are impregnated with a thinly liquid phosphate melt produced within the reaction chamber and having an alkali metal oxide to $P_2O_5$-molar ratio again of less than 1.3, preferably less than 1.1, by allowing the said melt to flow over the inside surface area of the graphite walls.

The apparatus used for carrying out this latter process is substantially the same as that described above, but the reaction tower is provided in its bottom portion with an overflow pipe optionally variable in height and with upper feed lines for supplying the starting components and with lower discharge lines for removing reaction product. The upper feed line is a multi-material nozzle. A plurality of additional nozzles, e.g. bi-material nozzles, the lower ends of which are directed towards the reaction zone, are arranged concentrically around the multi-material nozzle, the additional nozzles being fed through a cycle line, e.g. with the scrubbing liquid removed at the bottom portion of the scrubbing tower for treatment of the reaction off-gases.

During the continuous uninterrupted operation of a corresponding reaction tower it has been found that the starting products have to comply with rather specific requirements so as to obtain identical defined final products because reaction product portions are always removed together with the off-gas from the reaction chamber and, therefore, do not appear in the reaction melt accumulating in the bottom portion of the reaction tower. The composition of the reaction gases flowing off can be determined as a function of the content of reaction components in the aqueous solutions obtained in the series-connected water scrubbing stage. In any case, these solutions have an alkali metal or alkaline earth metal oxide to $P_2O_5$-molar ratio other than the starting products or the desired final products.

Examination of this phenomenon has resulted in valuable observations which determine the specific means disclosed in the present invention and which unexpectedly permit obviating the difficulties initially encountered in the attempt to produce defined final products.

Alkali metal phosphates are often prepared by neutralizing orthophosphoric acid with an alkali metal liquor or alkali metal carbonate. Condensed alkali metal phosphates can then be obtained therefrom by subsequent dehydration. Since the neutralizing operation is usually carried out batchwise, the adjustment of a certain $Alk_2O/P_2O_5$-molar ratio (Alk means an alkali metal or alkaline earth metal) is usually not difficult to achieve. The $P_2O_5$-content of the acid and the $Alk_2O$-value of the alkali metal added being known, the proportions necessary in each case to obtain a given $Alk_2O/P_2O_5$-molar ratio in the starting solution can be determined beforehand. It has furthermore been found by analytical examination that the molar ratio can ultimately be corrected, for example, by acidimetric titration. When a process other than described above is used for making alkali metal phosphates or alkaline earth metal phosphates, especially condensed phosphates, e.g. a process of the type wherein the $P_2O_5$-containing gases produced on burning phosphorus are directly reacted with alkali metal or alkaline earth metal-containing substances, such as carbonates, hydroxides or salts with volatile acids, considerable difficulties will arise in the attempt to obtain products having a determined and constant composition. Since these processes are concerned with commercial, continuous operations, it is not possible to control and, if necessary, to correct each batch. Even if the starting substances, i.e. the phosphorus and the alkali metal or alkaline earth metal compound, are fed in a given quantitative ratio through a volume meter to the reaction chamber, it is not ensured that the same quantitative ratio will be found in the final product, since the initial ratio of the components may be shifted during the reaction.

The present invention is based on the observation that the reaction of $P_2O_5$ obtained by burning phosphorus with alkali metal or alkaline earth metal salts in solid, dissolved and/or suspended form causes the $P_2O_5$ to appear predominantly in the resulting off-gas, so that the resultant final product contains correspondingly less $P_2O_5$. For this reason, the starting products used should be adjusted to contain $P_2O_5$ in an excess which is required to be greater in the production of acid products containing more $P_2O_5$ than in the production of alkaline products containing less $P_2O_5$. It has also been found that the extent to which the necessary $P_2O_5$-excess is used is unexpectedly a function of the temperature maintained in the reaction chamber. In other words, the excess of $P_2O_5$ should be the greater the higher such temperature. The $P_2O_5$ in excess appears together with a portion of the reaction product in the off-gas from which the solids can be removed by scrubbing with water and recovered in the form of a concentrated solution which, after appropriate neutralization, can be transformed, e.g. to alkali tripolyphosphate or pyrophoshate.

The following Table indicates the $Alk_2O/P_2O_5$-molar ratios necessary in the starting substances so as to obtain a given $Alk_2O/P_2O_5$-molar ratio in the condensed alkali metal phosphates obtained as the final products for the reaction of $P_2O_5$ with alkali metal compounds, wherein e.g. hydroxides, carbonates or other salts with volatile acids, which may be used in solid form or dissolved and/or suspended in a liquid, e.g. water, are directly introduced into the phosphorus combustion zone. The temperature data indicated in column III are referred exclusively to the Na-compounds. The temperatures to be applied for the K-compounds are all required to be correspondingly higher as described inter alia in the Examples below.

TABLE

| I | II | III |
|---|---|---|
| $Alk_2O/P_2O_5$-molar ratio desired in final product | $Alk_2O/P_2O_5$-molar ratio necessary in starting products | temperature in reaction chamber for Na-compounds in °C |
| 0.9 | 0.60–0.72 | 460–400 |
| 1.0 | 0.73–0.85 | 490–430 |
| 1.1 | 0.86–0.97 | 590–530 |
| 1.2 | 0.98–1.08 | 560–500 |
| 1.3 | 1.10–1.20 | 560–500 |
| 1.4 | 1.24–1.33 | 630–560 |
| 1.5 | 1.40–1.47 | 750–680 |
| 1.6 | 1.55–1.58 | 840–770 |

In column III, the higher temperature has always been listed first as this corresponds to the figures listed in column II.

In the Table, the $Alk_2O/P_2O_5$-molar ratio of the starting substances is always identified by an upper and a lower limit corresponding to the temperature range listed in column III applicable to the preparation of the corresponding product. The upper proportional value corresponds to the minimum temperature, i.e. that temperature at which the product can still be prepared in the form of a melt. On the other hand, the lower proportional value corresponds to the maximum temperature which should not be exceeded since no advantage would accrue therefrom, but the lifetime of the lining in the reaction chamber would unnecessarily be shortened. It is therefore advantageous to work at a mean temperature and accordingly at a mean value resulting from the lower and upper limits indicated for the $Alk_2O/P_2O_5$-molar ratio in the starting materials.

As follows from the above, considerable importance should be attached not only to the accurate adjustment of the above ratio, but also to the adjustment and maintenance of a constant temperature. These prerequisites call for the use of a reaction chamber having readily regulable and efficient cooling means disposed over its overall length.

It is understood that the values indicated in the above Table are merely intended to specify the preferred working range, and it is obvious that temperatures outside the upper and lower limiting values may also be applied without departing from the comprehensive scope of this invention, e.g. when some reason or other determines operation in other temperature ranges, e.g. at lower temperatures where some specific reason denies the desirability of obtaining a liquid melt. As more fully described above, it is merely necessary in such a case to adjust a determined $P_2O_5$-excess for each product to be prepared. Furthermore, the process of the present invention clearly is not limited to the manufacture of final products having the composition indicated in the above Table; it is also applicable to any intermediate value and to any composition having proportional values of below 0.9 and above 1.6.

The present invention is more especially concerned with a process for making alkali metal and/or alkaline earth metal phosphates by introducing alkali metal and/or alkaline earth metal compounds into $P_2O_5$-containing hot gases produced by burning phosphorus, which is preferably molten, with a gas containing free oxygen, wherein the starting product is adjusted to contain $P_2O_5$ in an excess within the range of about 1 to 50 mol percent, calculated on the alkali metal oxide or alkaline earth metal oxide to $P_2O_5$-molar ratio desired in the final product, resulting in the formation of a final product having a determined alkali metal oxide or alkaline earth metal oxide to $P_2O_5$-molar ratio. The $P_2O_5$-excess in the starting products is adjusted greater for the manufacture of relatively acid final products than for the manufacture of alkaline products, i.e. in such a way that an excess of about 40 mol percent is used for products having an alkali metal oxide or alkaline earth metal oxide to $P_2O_5$-molar ratio of 1.0, and an excess of about 2 mol percent is used for products having an alkali metal oxide or alkaline earth oxide to $P_2O_5$-molar ratio of 1.5. According to a further embodiment of the present invention, the reaction chamber is cooled and thereby maintained at a temperature constant for every desired alkali metal oxide or alkaline earth metal oxide to $P_2O_5$-molar ratio, the temperature maintained constant being kept higher for the manufacture of alkaline products than for the preparation of acid products.

In accordance with the present invention solid alkali metal or alkaline earth metal compounds may be used which are preferably fed through a multi-material nozzle. Alternatively, aqueous solutions or suspensions of the alkali metal or alkaline earth metal compounds may be fed to the phosphorus flame, e.g. atomized thereinto. Still further, a portion of the alkali metal or alkaline earth metal compounds may be used in the form of an aqueous solution or suspension and balance portion thereof in finely divided solid form and atomized into or in the immediate vicinity of the phosphorus flame, e.g. by atomizing the solid portion of the alkali metal and/or alkaline earth metal compounds centrally within the phosphorus flame and by atomizing the solution or suspension portion thereof from the outside into the phosphorus flame.

When sodium compounds are used, the walls of the reaction chamber are maintained at a temperature of about 470° C for a $Na_2O/P_2O_5$-molar ratio of 1.0 desired in the final product, of about 510° C for a ratio of 1.2, and of about 700° C for a ratio of about 1.5. When potassium compounds are used, the walls of the reaction chamber are maintained at a temperature of about 720° C for a desired $K_2O/P_2O_5$-molar ratio of 1.0, for example. The alkali metal and/or alkaline earth metal compounds include the hydroxides and/or salts having a volatile anion of the corresponding metals, e.g. the carbonates or halides, especially the chlorides. The following Examples illustrate the invention:

EXAMPLE 1

200 kg phosphorus were burnt per hour so as to produce a potassium polyphosphate having a $K_2O/P_2O_5$-molar ratio of 1.0 and corresponding to the composition: $(KPO_3)_n$. 395 kg finely divided KCl (98 percent strength) were blown per hour into the phosphorus flame. The $K_2O/P_2O_5$-molar ratio of the starting substances thus amounted to 0.80. The walls of the reaction chamber were air-cooled and thereby maintained at 720° C.

450 kg final product having the desired composition were obtained, corresponding to a yield of 65 percent, calculated on the feed. The balance was obtained in the form of a solution having a $K_2O$ to $P_2O_5$-molar ratio of 0.50 by scrubbing the off-gas with water.

EXAMPLE 2

200 kg phosphorus were burnt per hour so as to produce sodium polyphosphate having a $Na_2O$ to $P_2O_5$-molar ratio of 1.2. 362 kg $Na_2CO_3$ were introduced per hour into the phosphorus flame. The starting substances contained $Na_2O$ and $P_2O_5$ in the molar ratio of 1.04. The walls of the reaction chamber were air-cooled and thereby maintained at a temperature of 510° C.

515 kg of a melt having a $Na_2$ to $P_2O_5$-molar ratio of 1.2 were obtained per hour, corresponding to a yield of 78 percent, calculated on the feed. The balance was obtained in the form of a solution containing 45 percent by weight solid matter and having a $Na_2O$ to $P_2O_5$-molar ratio of 0.56 by scrubbing the off-gases coming from the reaction chamber with water. The solution was neutralized and then made into sodium tripolyphosphate.

EXAMPLE 3

200 kg phosphorus were burnt per hour so as to produce sodium polyphosphate having a $Na_2O$ to $P_2O_5$-molar ratio of 1.5, i.e. a so-called tetrapolyphosphate corresponding to the formula $Na_6P_4O_{13}$. 750 kg of a 50 percent aqueous sodium hydroxide solution were atomized per hour into the phosphorus flame. The $Na_2O$ to $P_2O_5$-molar ratio of the starting substances amounted to 1.45. The walls of the reaction chamber were air-cooled and thereby maintained at 700° C.

660 kg desired final product, corresponding to a yield of 90 percent, were obtained. The rest was obtained in the form of a concentrated aqueous solution having a $Na_2O$ to $P_2O_5$-molar ratio of 1.14 by scrubbing the off-gas with water. The solution was treated with a further quantity of sodium hydroxide solution and then made into sodium pyrophosphate.

EXAMPLE 4

200 kg liquid phosphorus were burnt per hour so as to produce a molten phosphate having a $Na_2O$ to $P_2O_5$-molar ratio of 1.50. 510 kg anhydrous soda (98 percent strength) suspended in 100 m³/hr air were blown into the flame through the same nozzle. About 300 liters scrubbing solution coming from the wet scrubbing stage series-connected with the reaction tower were introduced concurrently therewith through three bimaterial nozzles arranged concentrically around the phosphorus nozzle. The solution contained, per liter, 235 grams $P_2O_5$ and 150 grams $Na_2O$. 750 kg desired product, corresponding to a yield of 99 percent, were obtained per hour.

EXAMPLE 5

160 kg liquid phosphorus were burnt per hour so as to produce a molten phosphate having a $Na_2O$ to $P_2O_5$-molar ratio of 1.15. In a manner analogous so that described in Example 4, 365 kg NaCl (about 98 percent strength) suspended in 80 m³/hr oxygen were blown per hour into the phosphorus flame, and about 400 liters scrubbing solution were atomized into the phosphorus flame concurrently therewith through the three outer nozzles. The scrubbing solution came from the series-connected wet scrubbing stage which was operated, per hour, with 330 liters of an about 23 percent phosphoric acid which replaced the water. The scrubbing solution contained, per liter, 560 grams $P_2O_5$ and 150 grams $Na_2O$. 675 kg desired product, corresponding to a yield of approximately 98 percent, were obtained per hour. About 20 percent of the $P_2O_5$ contained in the product derived from the dilute phosphoric acid.

What is claimed is:

1. In a process for preparing sodium phosphates having a range of $Na_2O/P_2O_5$-molar ratios from 0.9 to 1.6 in which sodium hydroxide or a sodium salt having a volatile anion is introduced into a $P_2O_5$-containing hot phosphorus flame produced by burning phosphorus in a reaction chamber with a gas containing free oxygen; by feeding the sodium hydroxide or sodium salt and phosphorus into said reaction chamber in an amount sufficient to obtain $P_2O_5$ in an excess calculated on the molar ratio of sodium oxide to $P_2O_5$ desired in the final product the improvement which comprises feeding the sodium hydroxide or sodium salt and phosphorus according to the following relationship of molar ratio to the temperature of the walls of the reaction chamber during the burning reaction:

normal ratio of $Na_2O/P_2O_5$ feed material in the range of 0.60–0.72 burned in the reaction chamber with the walls in the range of 460°–400° C to produce a molar ratio of 0.9 in the final product, normal ratio of $Na_2O/P_2O_5$ feed material in the range of 0.73–0.85 burned in the reaction chamber with the walls in the range of 490°–430° C to produce a molar ratio of 1.0 in the final product, normal ratio of $Na_2O/P_2O_5$ feed material in the range of 0.86–0.97 burned in the reaction chamber with the walls in the range of 590°–530° C to produce a molar ratio of 1.1 in the final product, normal ratio of $Na_2O/P_2O_5$ feed material in the range of 0.98–1.08 burned in the reaction chamber with the walls in the range of 560°–500° C to produce a molar ratio of 1.2 in the final product, normal ratio of $Na_2O/P_2O_5$ feed material in the range of 1.10–1.20 burned in the reaction chamber with the walls in the range of 560°–500° C to produce a normal ratio of 1.3 in the final product, normal ratio of $Na_2O/P_2O_5$ feed material in the range of 1.24–1.33 burned in the reaction chamber with the walls in the range of 630°–560° C to produce a normal ratio of 1.4 in the final product, normal ratio of $Na_2O/P_2O_5$ feed material in the range of 1.40–1.47 burned in the reaction chamber with the walls in the range of 750°–680° C to produce a normal ratio of 1.5 in the final product, normal ratio of $Na_2O/P_2O_5$ feed material in the range of 1.55–1.58 burned in the reaction chamber with the walls in the range of 840°–770° C to produce a normal ratio of 1.6 in the final product, whereby the said excess of $P_2O_5$ and the coexisting constant wall temperature result in the defined $Na_2O/P_2O_5$ ratio in the end product.

* * * * *

PO-1050
(5/69)

UNITED STATES PATENT OFFICE
CERTIFICATE OF CORRECTION

Patent No. 3,655,334      Dated April 11, 1972

Inventor(s) Kurt Willi Harri Kribbe et al

It is certified that error appears in the above-identified patent and that said Letters Patent are hereby corrected as shown below:

On the front page, under [72] Inventor, lines 4 and 5 should read
-- Heinrich Kribbe, Edith Kribbe nee Kuhrt, heirs and
Heinz Harnisch, Joseph Cremer, co-inventors -- .
In the claim, column 7, line 25, "normal" should read -- molar -- ;
In the claim, column 7, line 29, "normal" should read -- molar -- ;
In the claim, column 8, line 3, "normal" should read -- molar -- ;
In the claim, column 8, line 7, "normal" should read -- molar -- ;
In the claim, column 8, line 11, "normal" should read -- molar -- ;
In the claim, column 8, line 13, "normal" should read -- molar -- ;
In the claim, column 8, line 15, "normal" should read -- molar -- ;
In the claim, column 8, line 17, "normal" should read -- molar -- ;
In the claim, column 8, line 19, "normal" should read -- molar -- ;
In the claim, column 8, line 21, "normal" should read -- molar -- ;
In the claim, column 8, line 23, "normal" should read -- molar -- ;
In the claim, column 8, line 25, "normal" should read -- molar -- ;

Signed and sealed this 3rd day of April 1973.

(SEAL)
Attest:

EDWARD M. FLETCHER, JR.
Attesting Officer

ROBERT GOTTSCHALK
Commissioner of Patents